Dec. 19, 1933.  A. O. BUCKIUS  1,940,204
JOURNAL BOX
Filed Jan. 14, 1929  4 Sheets-Sheet 4
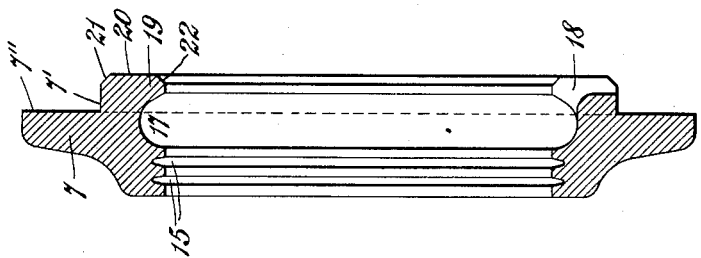
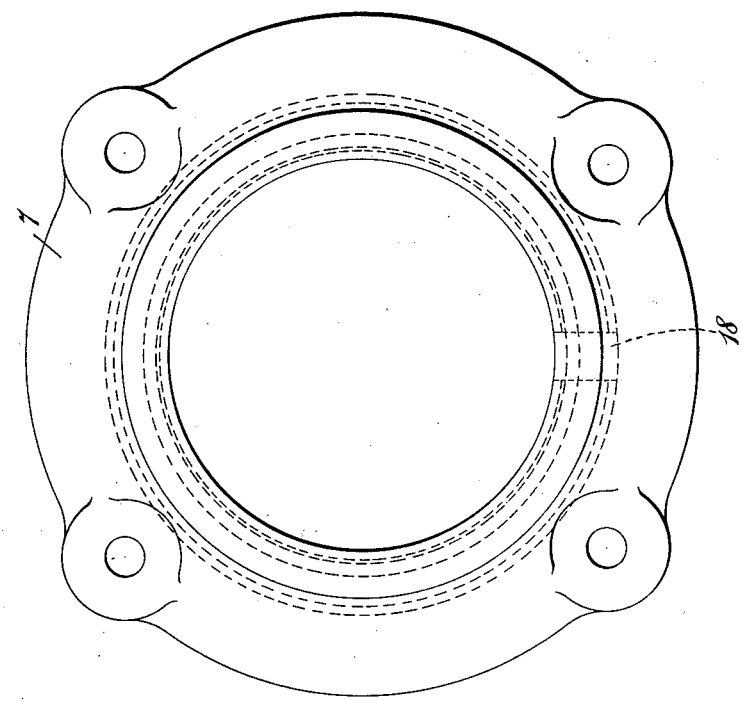
INVENTOR
ALBERT O. BUCKIUS
BY
Clarence N Kerr
ATTORNEY Patented Dec. 19, 1933

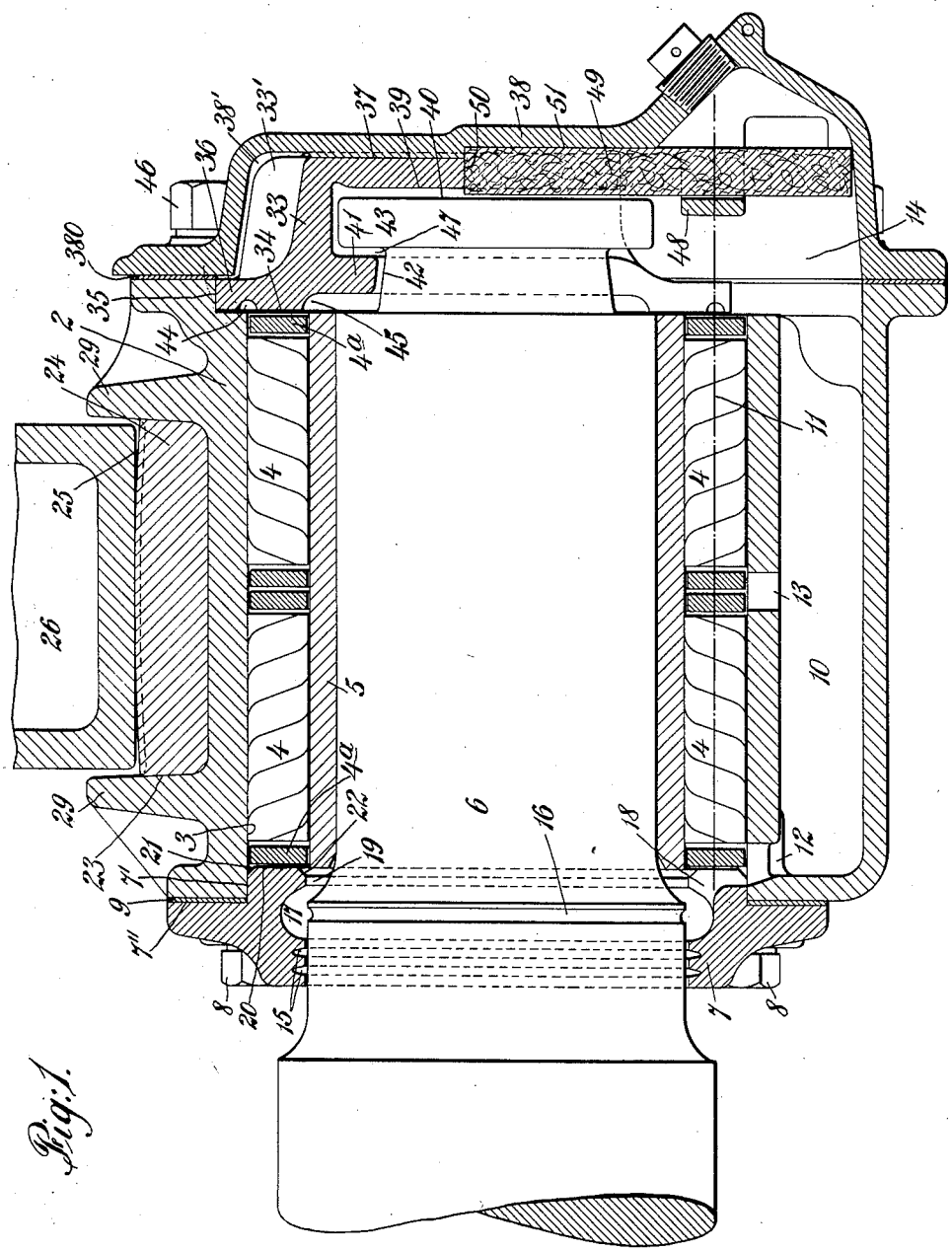

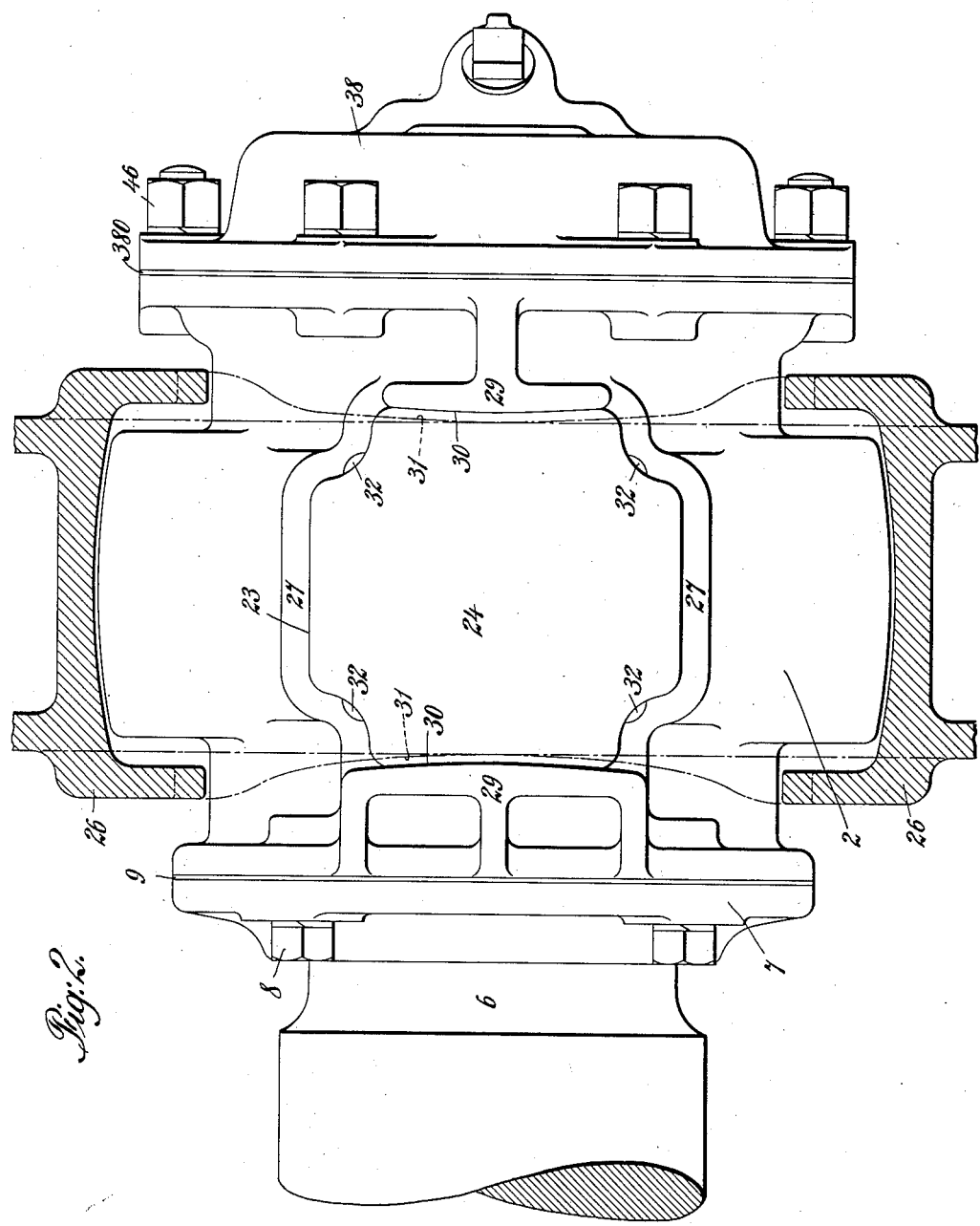

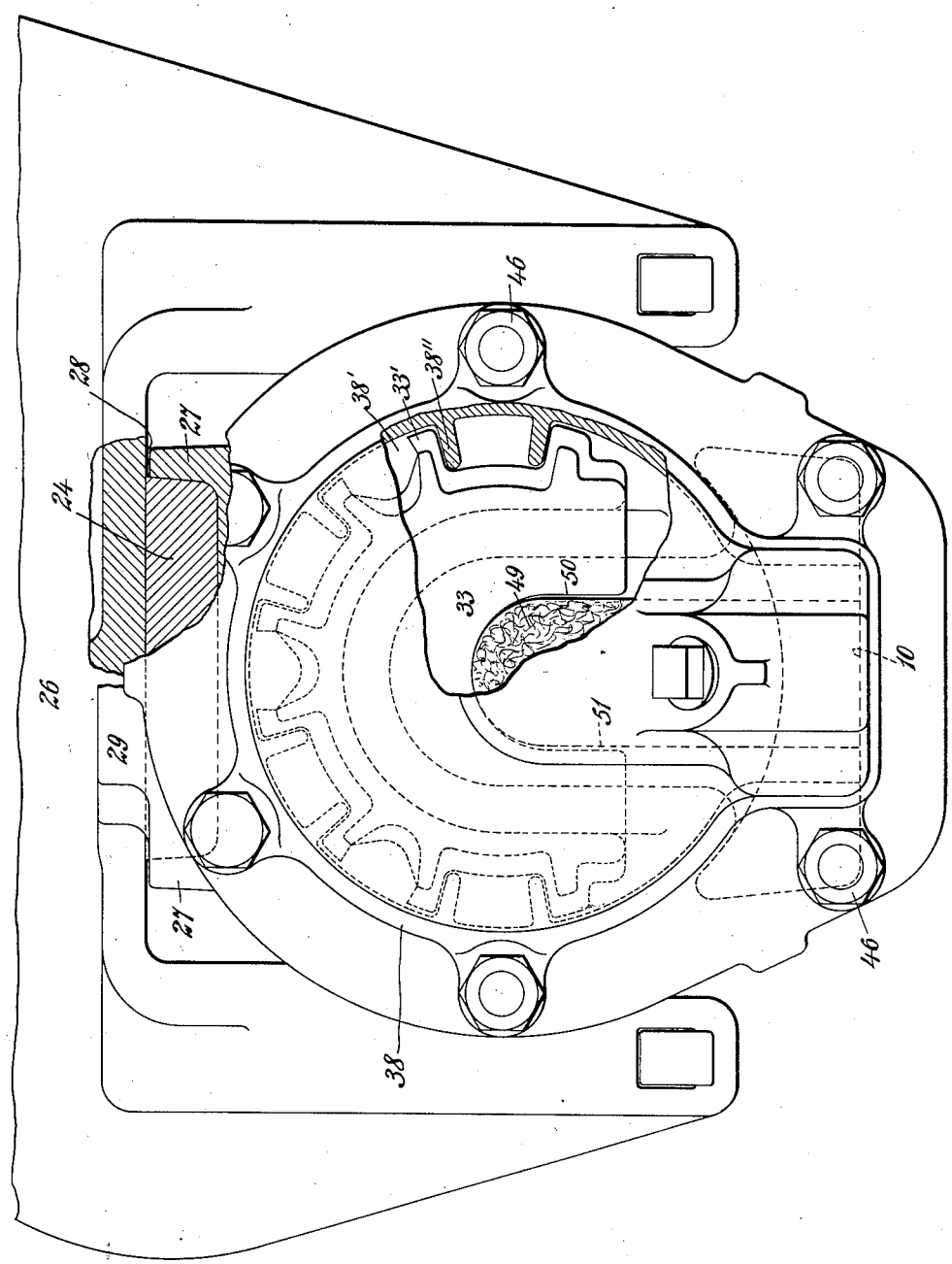

1,940,204

UNITED STATES PATENT OFFICE 1,940,204

JOURNAL BOX

Albert O. Buckius, Cleveland, Ohio, assignor to National Malleable and Steel Castings Company, Cleveland, Ohio, a corporation of Ohio Application January 14, 1929. Serial No. 332,346

9 Claims. (Cl. 308—180)

This invention relates to journal boxes. One of the objects of the invention is the provision of an improved journal box for car trucks and the like, which box is so constructed that its manufacture may be facilitated. I have in this connection devised an improved roller bearing journal box of a type shown in my pending application, Serial No. 248,343, filed January 21, 1928, wherein the inner surface of the box forms a race for the roller bearings; and the improved construction shown in the present application enables the various manufacturing operations, such as machining, case-hardening, and grinding to be more readily and expeditiously accomplished. My invention also comprises the provision of a novel and effective oil-retaining member, adapted to be removably connected to a journal box; as well as means whereby such member may act as a roller bearing retainer. Another feature of my invention resides in providing an improved and efficient wear plate construction for use between a journal box and cooperating side frame of a car truck. The invention further provides novel thrust-block and cover-plate structures, including an improved mounting for a lubricating wick. Other features and objects of the invention will be hereinafter described and claimed.

In the accompanying drawings, Fig. 1 is a vertical section of a journal box embodying my invention, a portion of the cooperating car truck side frame being also shown in section; Fig. 2 is a top plan view of the journal box, a portion of the side frame being shown in horizontal section and part in dot and dash lines; Fig. 3 is a front elevation, partly in section showing the journal box and part of the side frame; Fig. 4 is an end elevation of the separable oil-retaining member of the journal box; and Fig. 5 is a vertical sectional view of said member.

Referring more specifically to the drawings, the journal box comprises a housing 2 having a continuous inner cylindrical surface 3 forming a race for the roller bearings 4, two sets of which are shown. A cylindrical member 5 surrounding the axle 6 forms an inner race for the roller bearings. Cages or retaining rings 4a for said bearings are shown positioned between the inner and outer races referred to.

Surrounding the axle 6 and secured to the housing 2 is a member or plate 7 forming the rear portion of the journal box. This plate is provided with a cylindrical portion 7' shown in telescoping engagement with said housing, while an intermediate annular portion 7'' extending radially beyond the portion 7' of said plate is adapted to bear against the rear end of said housing. The plate 7 may be removably secured to housing 2 by cap screws 8. A gasket 9 is shown clamped between said plate and the housing to make the joint oil-tight. In the bottom portion of the housing there is provided an oil reservoir 10. The oil level is indicated by the line 11, the oil being free to reach the bearings through the passages 12 and 13 as well as from the front of the box at 14. The member 7 may be termed an "oil-retaining plate" since it serves to prevent the escape of oil through the rear of the journal box. In this connection said plate 7 is provided with grooves 15 surrounding the axle or journal 6 which grooves may be filled with a heavy packing grease to form an oil seal. Also, opposite the oil groove 16 in said axle, there is formed in the plate 7 an annular recess 17 which serves to collect the oil thrown off from said groove 16 and to direct said oil back to the roller bearings or to the oil reservoir 10. The oil can run by gravity through the opening 18 cut in the side wall 19 of the annular recess 17 in said oil-retaining plate 7.

In addition to its oil-retaining function the plate 7 acts as a retainer for the roller bearings 4. It will be noted in this connection that the end surface 20 of the portion 7' of said plate is adapted to bear against the inner cage member 4a for said bearings. Said surface 20 may be chamfered, as shown at 21 and 22, to avoid the wearing of shoulders therein by continual rubbing of said cage.

At the top of the journal box I have shown a recess 23 for the reception of the wear plate 24. The latter may be crowned transversely, as at 25, to provide for a rocking bearing between the journal box and the side frame 26 of the car truck. The opposite side walls 27 (Figs. 2 and 3) of the recess 23 are of such height as to provide a clearance 28 between said walls and the side frame; while the other two side walls 29 of said recess are extended above the top surface of the wear plate 24 so as to provide a thrust-bearing for the side-frame. The thrust-bearing surface 30 of each side wall 29 and the cooperating surfaces 31 of the side frame may be arcuate or curved as indicated in Fig. 2. As indicated at 32 in Fig. 2, the recess 23 may be provided with slightly chamfered portions to provide for spot welding the wear plate to the journal box.

A thrust block 33 cooperates with the front portion of the journal box housing 2. The arcshaped surface 34 of said thrust block is interrupted only to the extent required to pass over the journal and cooperates with the outer roller bearing cage members 4a so as to assist in holding the roller bearing in place. The housing 2 is counter-bored at 35 to receive the flange 36 of the thrust block. At its outer face 37 said thrust block bears against the inner face of the cover 38, while the inner face 39 of said block is adapted to bear against the end face 40 of the axle; whereby inward thrusts of the box relative to the axle are taken up. Block 33 also has a semi-circular projection 41 adapted to seat in a recess 42 behind the annular shoulder 43 on the end of the axle and to bear on said shoulder and thereby take up endwise outward thrusts of the box relative to the axle. The roller-bearing retaining surface 34 of the thrust block has been relieved at 44 and 45 to avoid the wearing of shoulders therein by the roller bearing cage. The cover 38 may be removably secured to the journal box housing 2 through any suitable means such as bolts 46. A gasket 380 is shown between the cover 38 and the front end of the housing 2. To prevent rotation of the thrust block 33 with respect to the cover 38 said block may be provided with radially extending shoulders, such as indicated at 33', fitting into recesses 38' between lugs 38'' on the inner face of the cover. In order to remove the thrust block for inspection the cover 38 is first removed and the journal box may then be slid inwardly a short distance corresponding to the difference between the thickness of thrust block flange 36 and the clearance at 47 between the thrust block and the shoulder 43 on the axle. Said block may now be readily removed.

Extending through a staple 48 on the inside of the cover 38 is a lubricating wick 49. This wick projects into a slot or central recess 50 in the thrust block 33. I provide in the cover 38 a recess 51 which surrounds the top and sides of the wick and maintains the latter in its proper relation to the cover. Said recess 51 further serves to facilitate the assembly of the parts, since it insures that when the cover is applied with the wick in place said wick will be held in alignment with the recess 50 in the thrust block.

It will be seen that through the provision of the plate 7, separable from the journal box housing 2, the operations incident to the manufacture of the journal box may be greatly expedited. Thus, it is manifestly easier to machine the surfaces 20, 21 and 22 when they form part of the member 7 then when they form an integral part of the journal box housing itself, with the consequent necessity of inserting the machining tool from the opposite end of the box. Furthermore, the separable plate 7 may be made of one material and the housing 2 of another. For example, the plate 7 may be made of cast iron or other material more easily machinable than that used for the housing and also better able to resist wear occasioned by the rubbing contact with the hardened roller cage. Case-hardening can also be carried out very expeditiously with my improved journal box construction wherein both the cover 38 and member 7 are separable from the housing 2, since said housing may be simply set up on one end, the openings 12 and 13 suitably sealed off from the oil reservoir 10, and the housing then filled with carburizing material. With my construction it is a simple matter to case-harden the desired interior surfaces of the housing 2 without case-hardening any other parts of the box. Before case-hardening, all machining on the box is done excepting the final grinding operation on the inner roller race surface of said box. Due to the fact that the member 7 forms a separable portion of the box removable from the housing 2, it will be readily apparent that the grinding of the case-hardened inner surface of said housing is facilitated and can be more effectively carried out for the reason that the grinding wheel can pass completely through the housing from one side to the other. A more perfect grinding job is thereby insured at the inner end of the housing 2 where, if the grinding wheel could not pass all the way through, any irregularity of the wheel would show up in the housing; as, for example, if the grinding wheel were not square and sharp at its inner side, but rounded off due to wear.

It may be further noted that my separable oil retaining plate 7 may be readily replaced in case of wear and that in addition the provision of said separable plate results in simplifying the work of casting the housing 2. The provision of said plate 7 thus represents a decided advance in the art and presents marked and improved advantages over previous designs wherein the rear end of the journal box was integral with the housing.

The terms and expressions which I have employed are used as terms of descriptions and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a journal box, a housing, a thrust-block engageable with an annular shoulder on the journal, said housing being counter-bored at one end to receive a flange on said thrust-block.

2. In a journal box, a housing, a cover secured to said housing, and a thrust-block bearing at its outer surface against the interior of said cover, and having a flange fitting within a counter-bored portion at one end of said housing.

3. In a roller bearing journal box, a car journal extending into said box having a shoulder of enlarged diameter adjacent the inner end of said box, a roller bearing co-operating with said box and said journal, an inner end closure secured to said box, said closure having an oil collecting cavity facing said journal opposite said shoulder, said closure having a portion between said cavity and said roller bearing extending radially inwardly and serving as a retainer for said bearing, and serving also to prevent oil thrown from said roller bearing from entering said oil collecting cavity.

4. In a roller bearing journal box, a car journal extending into said box having a shoulder of enlarged diameter adjacent the inner end of said box, a roller bearing co-operating with said box and said journal, an inner end closure secured to said box, said closure having an oil collecting cavity facing said journal opposite said shoulder, said closure having a portion between said cavity and said roller bearing extending radially inwardly and serving to prevent oil thrown from said roller bearing from entering said oil collecting cavity.

5. In a roller bearing journal box, a housing having an oil reservoir at the bottom thereof, a closure member for the inner end of the housing, said member having an annular projection extending into the housing, said projection having, on its side facing the journal, an oil receiving recess for conducting oil thrown off by the journal back to said oil reservoir, another surface of said projection acting as a roller bearing retainer.

6. A roller bearing journal box comprising a housing having a hardened and ground internal bore serving as an outer roller race, said bore being uninterrupted and of uniform diameter from end to end of said housing, and a separate rear closure member secured to the inner face of said housing and having an oil collecting cavity.

7. A roller bearing journal box comprising a housing having a hardened and ground internal bore serving as an outer roller race, said bore being uninterrupted and of uniform diameter from end to end of said housing, and a separate rear closure member secured to the inner face of the housing and having an inwardly extending projection forming an oil collecting cavity and roller bearing retainer.

8. In a journal box having an oil reservoir and adapted to receive roller bearings, an oil retaining member separable from said box and forming the rear portion thereof, said member having a recess for receiving oil thrown from the journal, said recess facing the journal and being adapted to receive oil therefrom, and means on said member acting as a bearing retainer and adapted to divert oil forced from the bearing back to the reservoir.

9. In a journal box having an oil reservoir and adapted to receive roller bearings, an oil retaining member separable from said box and forming the rear portion thereof, said member having a recess with outwardly flaring side walls presenting a broad opening facing the journal, said recess being adapted to receive oil thrown from the journal, and means on said member acting as a roller bearing retainer and lying across the ends of the bearings.

ALBERT O. BUCKIUS.